Oct. 20, 1942.                H. A. MULLER                2,299,646
          ELECTRIC OPERATED DOOR UNLOCKER FOR MOTOR VEHICLES
                     Filed Aug. 6, 1941        3 Sheets-Sheet 1
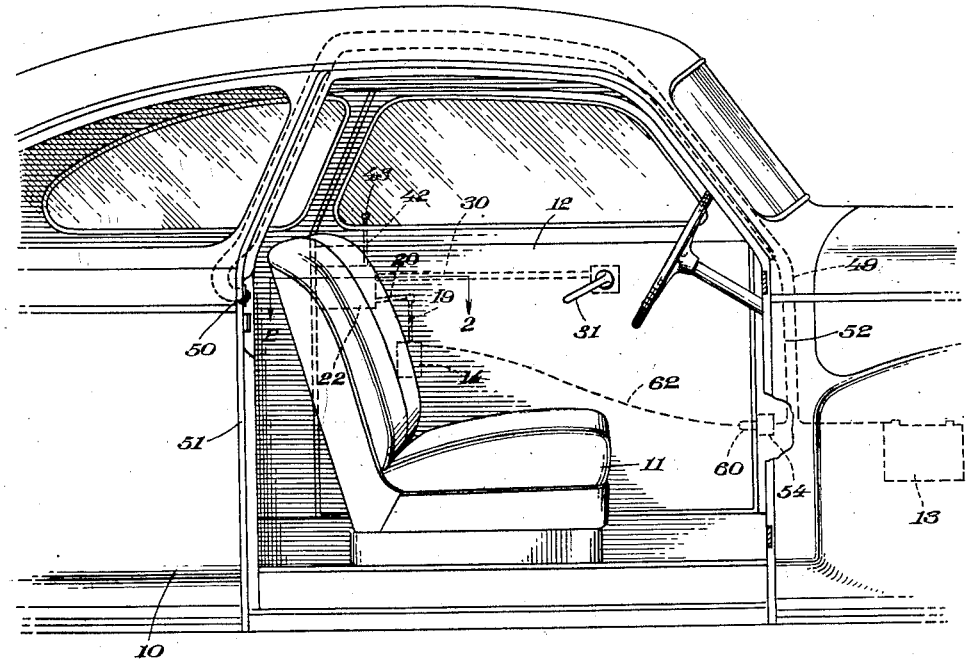
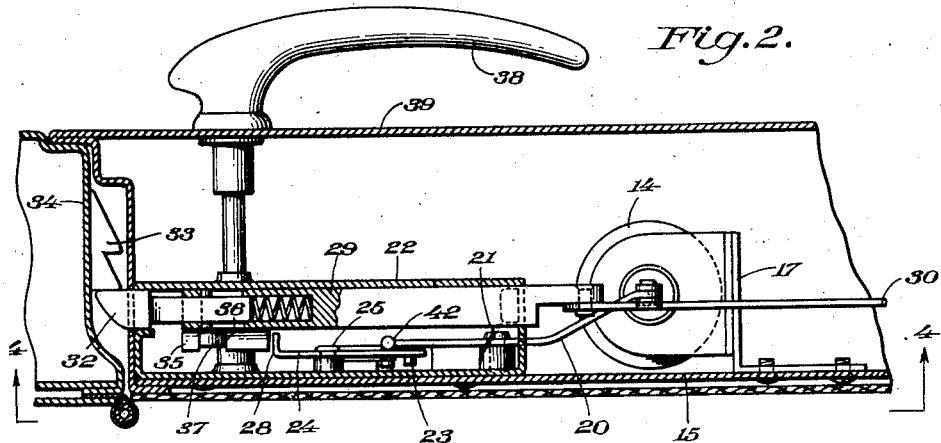
Henry A. Muller:
INVENTOR.
BY
*Victor J. Evans & Co.*
ATTORNEYS Oct. 20, 1942.  H. A. MULLER  2,299,646
ELECTRIC OPERATED DOOR UNLOCKER FOR MOTOR VEHICLES
Filed Aug. 6, 1941  3 Sheets-Sheet 3
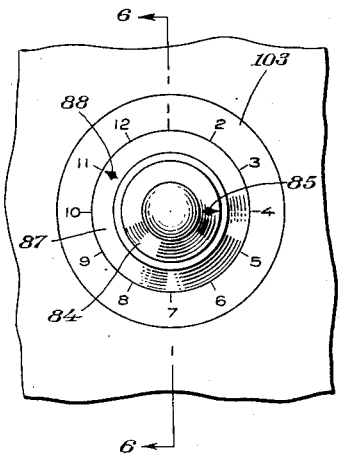
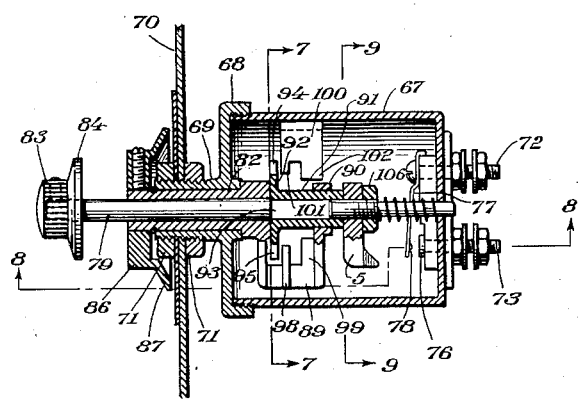
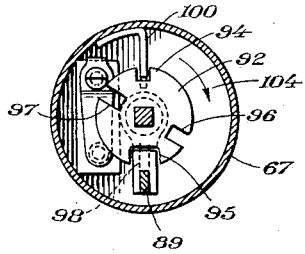
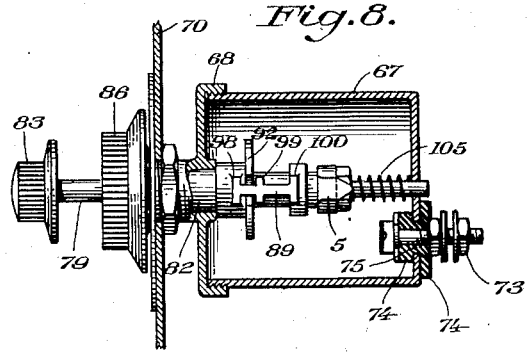
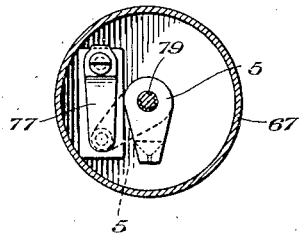
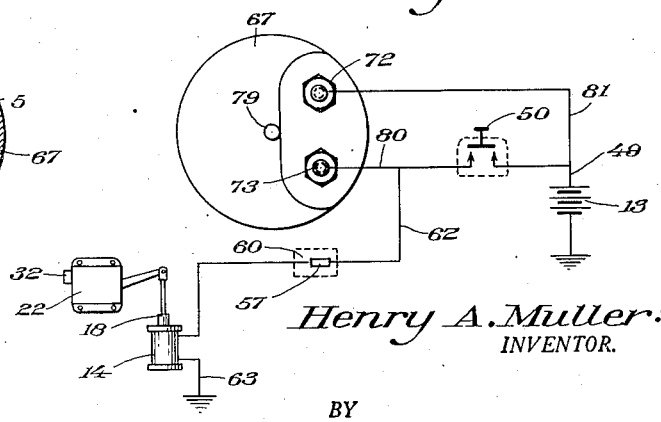
Henry A. Muller:
INVENTOR.
BY
Victor J. Evans & Co.
ATTORNEYS Patented Oct. 20, 1942

2,299,646

UNITED STATES PATENT OFFICE 2,299,646

ELECTRIC OPERATED DOOR UNLOCKER FOR MOTOR VEHICLES

Henry A. Muller, Pittsburgh, Pa.

Application August 6, 1941, Serial No. 405,709

5 Claims. (Cl. 70—283)

This invention relates to an electric operated door unlocker for motor vehicles.

It is desirable in observing the amenities that a driver seat a front seat passenger first and then walk around the vehicle to his driver's position. The driver must stand in traffic while he unlocks the driver's door or has it unlocked for him by the driver's passenger.

The present invention provides a button in the door jamb at the passenger's side of the front seat, a source of electricity, a solenoid, and means connecting the solenoid to the door latch on the driver's side of the front seat so that after the driver has seated his passenger he may press the button, close the door and then walk around to his driver's position and find the door already unlocked so that he need not stand in traffic before assuming his driver's position in the vehicle.

A further object is to provide a door unlocker which will include a switch which can be placed at any convenient point in the solenoid circuit to be used if a door key is lost to operate the opener, the switch being controlled by a combination lock.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a side elevation of a portion of an automobile equipped with an electric operated door unlocker constructed in accordance with the invention, the door on the passenger's side of the front seat being removed to expose the button switch.

Figure 2 is a horizontal sectional view taken on the line 2—2 of Figure 1, drawn to large scale.

Figure 3 is a detail sectional view showing the connectors for conducting the current through the hinged side of the door.

Figure 5 is a front elevation of the combination switch used in a solenoid circuit.

Figure 6 is a longitudinal sectional view of the combination switch taken on the line 6—6 of Figure 5 and showing the push rod in position at one stage of the combination and requiring a further setting to permit the arm of the push rod arriving at position to close the switch contact.

Figure 7 is a cross sectional view taken on the line 7—7 of Figure 6.

Figure 8 is a longitudinal sectional view taken on line 8—8 of Figure 6.

Figure 9 is a cross sectional view taken on the line 9—9 of Figure 6.

Figure 10 is a rear end elevation of the combination switch and showing the electrical connections thereof with the solenoid circuit.

Figure 4:
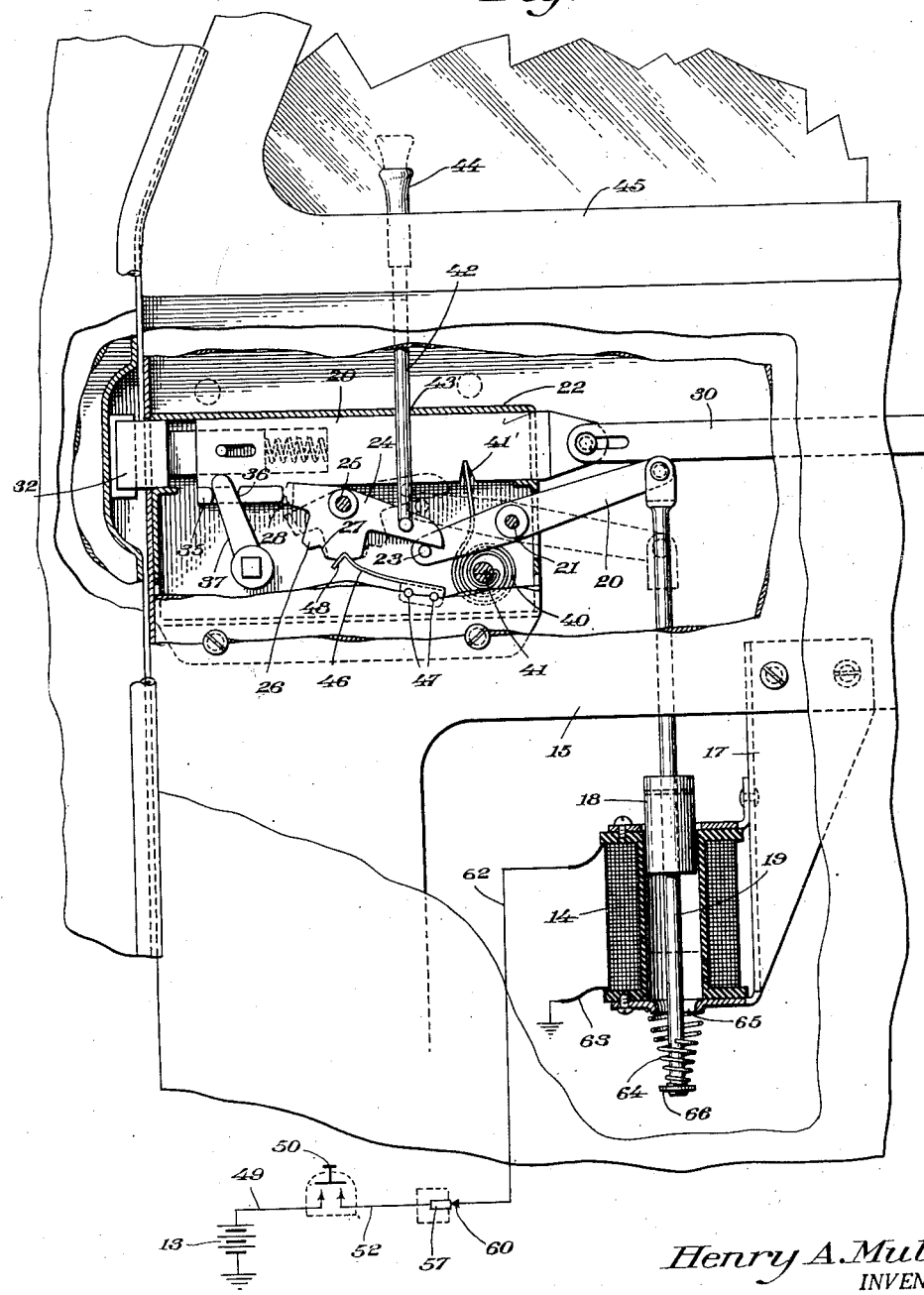
Figure 4 is a front elevation of a portion of the driver's door, looking in the direction of the line 4—4 of Figure 2, with portions broken away to expose the door unlocker shown in full lines in locked position and in dotted lines in unlocked position.

Referring now to the drawings in which like characters of reference designate similar parts in the various views, 10 designates an automobile, 11 the driver's seat thereof, 12 the door on the driver's side of the seat, and 13 the source of electricity, these parts being conventional.

In carrying out the invention a solenoid 14 is secured to the frame 15 of the driver's door inner wall by an angular bracket 17, see Figure 2. The solenoid is disposed in vertical position and is provided with a movable core 18 carried by a rod 19 which projects at both ends from the core.

The upper end of the rod 19 is pivotally connected to one end of a rock lever 20 which is pivotally mounted intermediate its ends to a pivot pin 21 carried by one wall of a latch housing 22, see Figure 2. The free end of the lever is provided with a laterally disposed pin 23.

A detent 24 is pivotally mounted intermediate its ends on a pivot pin 25 which projects from the wall of the housing, again see Figure 2. The detent is provided with a depending notched plate 26 having an arcuate periphery whose center is the pivot pin 25 and having two notches 27 in the periphery, see Figure 4. One end of the detent overlies the laterally disposed pin 23 of the rock lever 20. The other end of the detent is provided with a laterally disposed tooth 28, see Figure 2.

A latching bolt 29 is slideably mounted in the housing 22 and at one end is connected by a reach rod 30 to the inside door handle 31, see Figure 1. The bolt is provided with a spring pressed head 32 which enters a keeper 33 on the jamb 34 of the driver's door, see Figure 2.

The bolt is provided near the head with a flange 35 having a notch 36 therein to receive the crank arm 37 of the handle 38 disposed on the exterior of the outer wall 39 of the driver's door, see Figure 2. The handle, as is customary, is turned to swing the crank arm 37 to engage one wall of the notch 36 and retract the bolt to permit the door to be opened from the outside. The bolt is spring pressed to closed position by a coil spring 40, see Figure 4, which is secured at one end to a pin 41 which is anchored to the wall of the housing 22. The free end of the spring is engaged in a notch 41' formed in the bottom edge of the bolt.

The tooth 28 of the detent is disposed in rear of the notched flange 35 when the bolt is closed, that is, is in latching position. The detent must be rocked from the full line position shown in Figure 4 to the dotted line position to dispose the tooth out of the path of the flange when the door is to be opened. For this purpose a rod 42 is pivotally connected at the lower end to the rear end of the detent and extends vertically upward through an opening 43 in the housing 22. The upper end of the rod is equipped with a button 44 which projects above the bottom of the window frame 45. By pulling the rod 42 upward the rear end of the detent is elevated and the tooth 28 is dislodged from in rear of the notched flange 35 to permit the door to be opened from the exterior by turning the handle 38. When the rod 42 is pushed down the reverse movement of the detent takes place and the tooth is lodged in rear of the notched flange to hold the door locked.

The solenoid 10 serves as a medium for electrically moving the detent 24 independent of manipulation of the rod 42. By referring to Figure 4 it will be seen that when the solenoid is energized the rod 19 pulls the lever 20 downward at the outer end and elevates the inner end. The pin 23 on the inner end of the lever thereupon rocks the detent to dislodge the tooth 28 from in rear of the notched flange 35 and permit the door to be opened from the outside.

A leaf spring 46 is secured stationary at one end to the housing 22 by rivets 47 or other connectors. The free end of the leaf spring is provided with a V-shape offset 48 which enters the notches 27 of the detent selectively and yieldably holds the detent either in operative position to hold the bolt against being retracted or in released position, shown by dotted lines in Figure 4, to permit the bolt to be retracted.

For energizing the relay a circuit wire 49 is connected to the source of current 13, and is connected to a push button switch 50 secured to the jamb 51 of the door on the passenger's side of the driver's seat. A circuit wire 52 returns from the switch to a resilient conductor 53 which is secured to an insulating base 54 by one of the securing bolts 55 which attach the base to the door frame 56 at the hinged side of the door, see Figure 3. The resilient conductor bears against a pin 57 which is slideably mounted in an opening 58 in the base 54 and projects through an opening 59 in the door frame. A conductor 60 is secured to the hinged side of the driver's door and is insulated therefrom by a bushing 61. A wire 62 leads from the conductor to one end of the coil of the solenoid, see Figure 4. The other end of the coil of the solenoid is grounded as shown at 63 on any suitable metal part of the automobile door.

When the push button is operated current will flow from the source of current through electrical connections and solenoid to energize the solenoid. The core 18 is drawn into the solenoid when the solenoid is energized to pull down the lever 20 and raise the free end of the detent to draw the tooth 28 of the detent from obstructing position back of the notched flange 35 and permit the driver's door being opened from the outside through the medium of the handle 38.

A helical spring 64 is secured at one end to the bottom of the solenoid through the medium of an annular lip 64 and is secured at the other end to the rod 19 of the solenoid core 18 of a nut 66. The spring is a retractile spring, and yieldably holds the core 18 at its released upper position in the solenoid so that the pin 23 of the lever 20 is normally spaced from the detent and cannot rattle against the detent due to vehicle vibration when the detent is in position to permit the bolt to be opened. When the detent is in position to prevent the bolt from being opened the pin 23 will be yieldably held against the detent so that in this position also rattling will be prevented.

The combination switch comprises a shell 67 having a cover 68 provided with a threaded nipple 69 which may be engaged into a suitable opening in the body 70 or other part of the motor vehicle and secured thereto by a pair of nuts 71.

A pair of binding posts 72 and 73 are secured to the rear end wall of the shell and insulated therefrom. Inside the shell one of the binding posts is equipped with a switch contact 76. The other binding post is equipped with a spring arm 77 which terminates in a switch contact 78. The switch contact 78 overlies the contact 76 and is adapted to be moved to circuit closing position against the contact 76 by an insulating arm 5 on a push rod 79.

The binding posts are connected to the solenoid circuit between the push button 50 and the combination switch through the medium of a conductor wire 80 which is connected to the conductor wire 62 and to the binding post 73, and a conductor wire 81 which is connected to the binding post 72 and to the supply wire 49 from the battery 13.

The push rod 79 is slidably and rotatably mounted in a bushing 82 which is rotatably mounted in the nipple 69. The push rod is equipped with a button 83 disposed exteriorly of the vehicle body 70 and the button is provided with a flange 84 displaying a pointer 85, see Figure 5. The bushing 82 is provided exteriorly of the body of the car with a hollow button 86 which receives one of the nuts 71, and which is provided with a flange 87 displaying a pointer 88, see Figure 5.

The tumbler mechanism comprises a U-shaped member 89 having one leg formed integral with the bushing 82 and having the other leg provided with a bearing eye 90 which slidably and rotatably receives the tubular extension 91 of a disk 92. The tubular extension has a substantially rectangular bore which non-rotatably receives a substantially rectangular portion 93 of the push rod 79.

The disk is provided in the periphery with two pairs of diametrically disposed slots 94 and 95, and 96 and 97, and the U-shaped member 89 has its transverse portion in the form of a web provided with two pins 98 and 99. An arm 100 projects from the shell 67 radially toward the push rod and is provided with two pins 101 and 102.

To operate the combination switch the push rod button 83 is rotated to a predetermined point indicated on a dial 103 as indicated by the arrow 85 at which time the slot 94 of the disk 92 will be brought into alignment with the pin 101 of the arm 100. With the knob 83 now held stationary the hollow button 86 is rotated to a predetermined point on the dial as indicated by the arrow 88. At this time the pin 98 of the U-shaped member 89 will be brought into alignment with the slot 95 in the disk 92. At this time the push rod 79 may be pushed rearwardly until the disk 92 contacts the pin 99 of the U-shaped member 89 and the pin 102 of the arm 100, preventing further movement of the push rod. The button 83 is now again turned in the direction of the arrow head 104, see Figure 7, until the slot 97 of the disk 92 is brought into alignment with the pin 102 of the arm 100. At this time the slot 96 will also have arrived in alignment with the U-shaped member 89 and this time the push rod may be pushed endwise its full length of movement to impinge the push rod arm 5 against the leaf spring 77 and move the contact 78 into circuit closing position in with the contact 76, as shown by the dotted line position of the arm, see Figure 9. A helical spring 105 is sleeved on the push rod between the end of the shell 67 and a nut 106 which is threadedly engaged on the push rod. The spring returns the push rod to normal position after each actuation since the push rod need merely be held momentarily in operative position and then released to accomplish energizing of the solenoid.

By arranging the slots on the disk 92 in different positions different combinations may be made up. Also by changing the position of the switch arm 5 different combinations can be made up. By triplicating the slots and pins, or even quadrupling the same different combinations can be made up.

From the above description it is thought that the construction and operation of the invention will be fully understood without further explanation.

What is claimed is:

1. An electrically operated door unlocker for a motor vehicle comprising, a spring projected bolt on one door of a motor vehicle, said bolt having an integral flange, a centrally pivoted detent, a manually operable push rod adapted to move the detent to obstructing position with relation to the flange, a pivoted lever adapted to move the detent to unobstructing position with relation to the flange to permit the bolt to be retracted, means for releasably holding the detent in obstructing or unobstructing position, a solenoid having a core connected to the lever for actuating the lever, means connected to the core for yieldably holding the lever in engagement with the detent to prevent rattling, and a switch controlled electric circuit for the solenoid.

2. The structure as of claim 1 and in which the first named means comprises, an arcuate notched member depending from the detent and whose center of curvature is the pivot of the detent, and a leaf spring having its free end deformed to releasably engage in the notches interchangeably.

3. The structure as of claim 1 and in which the second named means comprises, a rod projecting at both ends through the core and pivotally connected at one end to the lever, and a retractile spring fixed to the solenoid and to the other end of the rod for holding the core at its outer limit of movement when the solenoid is de-energized.

4. The structure as of claim 1 and in which the last named means comprises circuit wires connected to the solenoid, and a push button switch on a door of the vehicle other than the door to which the spring projected bolt is applied to permit a driver unlocking one door with a key and operating the push button switch at the same door to unlock another door of the vehicle.

5. The structure as of claim 1 and in which the last named means comprises a combination lock switch disposed on the vehicle, and circuit wires connecting the switch to the solenoid and to a source of electricity to permit the solenoid to be energized in the event that the key for the vehicle door is lost.

HENRY A. MULLER.